US012023832B2

United States Patent
Moens

(10) Patent No.: US 12,023,832 B2
(45) Date of Patent: Jul. 2, 2024

(54) AUTOMATED IN-MOLD LABEL HANDLING AND PRODUCT UNLOADING DEVICE FOR USE WITH A PLASTIC MATERIAL INJECTION-MOLDING MACHINE

(71) Applicant: Wilhelmus Canisius Franciscus Moens, Beverwijk (NL)

(72) Inventor: Wilhelmus Canisius Franciscus Moens, Beverwijk (NL)

( * ) Notice: Subject to any disclaimer, the term of this patent is extended or adjusted under 35 U.S.C. 154(b) by 252 days.

(21) Appl. No.: 17/769,920

(22) PCT Filed: Oct. 20, 2020

(86) PCT No.: PCT/EP2020/079480
§ 371 (c)(1),
(2) Date: Apr. 18, 2022

(87) PCT Pub. No.: WO2021/078729
PCT Pub. Date: Apr. 29, 2021

(65) Prior Publication Data
US 2022/0371240 A1   Nov. 24, 2022

(30) Foreign Application Priority Data

Oct. 21, 2019   (NL) ..................................... 2024070

(51) Int. Cl.
*B29C 45/00*   (2006.01)
*B29C 45/14*   (2006.01)
(Continued)

(52) U.S. Cl.
CPC ........ *B29C 45/14008* (2013.01); *B29C 45/80* (2013.01); *B29C 2045/14918* (2013.01);
(Continued)

(58) Field of Classification Search
CPC ........ B29C 2045/7633; B29C 45/4225; B29C 2045/14049; B29C 2045/14918; B29C 45/14008; G05B 2219/45244
See application file for complete search history.

(56) References Cited

U.S. PATENT DOCUMENTS

| 4,840,366 A | * | 6/1989 | Johnston | ............. | B29C 49/2408 |
| | | | | | 271/14 |
| 5,121,913 A | * | 6/1992 | Klinedinst, Sr. | .... | B29C 49/2408 |
| | | | | | 271/107 |

(Continued)

FOREIGN PATENT DOCUMENTS

| CH | 710749 A2 | 8/2016 |
| CN | 203994424 U | 12/2014 |

(Continued)

OTHER PUBLICATIONS

JP-2009096012-A (Hashimoto) May 2009 (online machine translation), [Retrieved on Feb. 6, 2024]. Retrieved from: Espacenet (Year: 2009).*

(Continued)

*Primary Examiner* — Seyed Masoud Malekzadeh
*Assistant Examiner* — Andres E. Behrens, Jr.
(74) *Attorney, Agent, or Firm* — Tutunjian & Bitetto, P.C.

(57) ABSTRACT

An automated in-mold label handling and product unloading device for use with a plastic material injection molding machine includes a label handling arm provided with a label holder at an outer end thereof, and a product unloading arm provided with a product gripper at an outer end thereof. The device has a stationary frame and a first linear guide device that supports the label handling arm so as to reciprocate along a y-axis direction. The device has a second linear guide device that supports the product unloading arm so as to reciprocate along a y-axis direction. The first and second linear guide devices are guided relative to the frame to be (Continued)

movable parallel to the x-axis. A label handling arm x-axis drive mechanism has a first drive motor mounted on the frame and a first transmission coupled to said first drive motor and to the first linear guide device.

14 Claims, 5 Drawing Sheets

(51) Int. Cl.
    *B29C 45/17*     (2006.01)
    *B29C 45/76*     (2006.01)
    *B29C 45/80*     (2006.01)

(52) U.S. Cl.
    CPC ............... *B29C 2045/1794* (2013.01); *B29C 2945/76568* (2013.01); *B29C 2945/76795* (2013.01)

(56) References Cited

U.S. PATENT DOCUMENTS

| | | | | |
|---|---|---|---|---|
| 2008/0275593 | A1* | 11/2008 | Johansson | G05B 19/41825 901/50 |
| 2012/0088000 | A1* | 4/2012 | Armbruster | B29C 45/006 425/135 |
| 2013/0101695 | A1* | 4/2013 | Schad | B29C 45/14008 425/556 |
| 2015/0158225 | A1* | 6/2015 | Schad | B29C 45/42 264/334 |
| 2018/0104875 | A1* | 4/2018 | Hoeglinger | B29C 45/80 |

FOREIGN PATENT DOCUMENTS

| | | | |
|---|---|---|---|
| CN | 105965498 A | | 9/2016 |
| EP | 1384562 A1 | | 1/2004 |
| JP | 2009096012 A | * | 5/2009 |
| JP | 2009096012 A | | 5/2009 |
| JP | 2016203418 A | * | 12/2016 |
| NL | 1032959 C1 | | 5/2008 |

OTHER PUBLICATIONS

JP-2016203418-A (Hishikawa) Dec. 2016 (online machine translation), [Retrieved on Feb. 6, 2024]. Retrieved from: Google (Year: 2016).*

International Search Report for PCT/EP2020/079480 dated Nov. 2, 2020 (2 pgs).

* cited by examiner

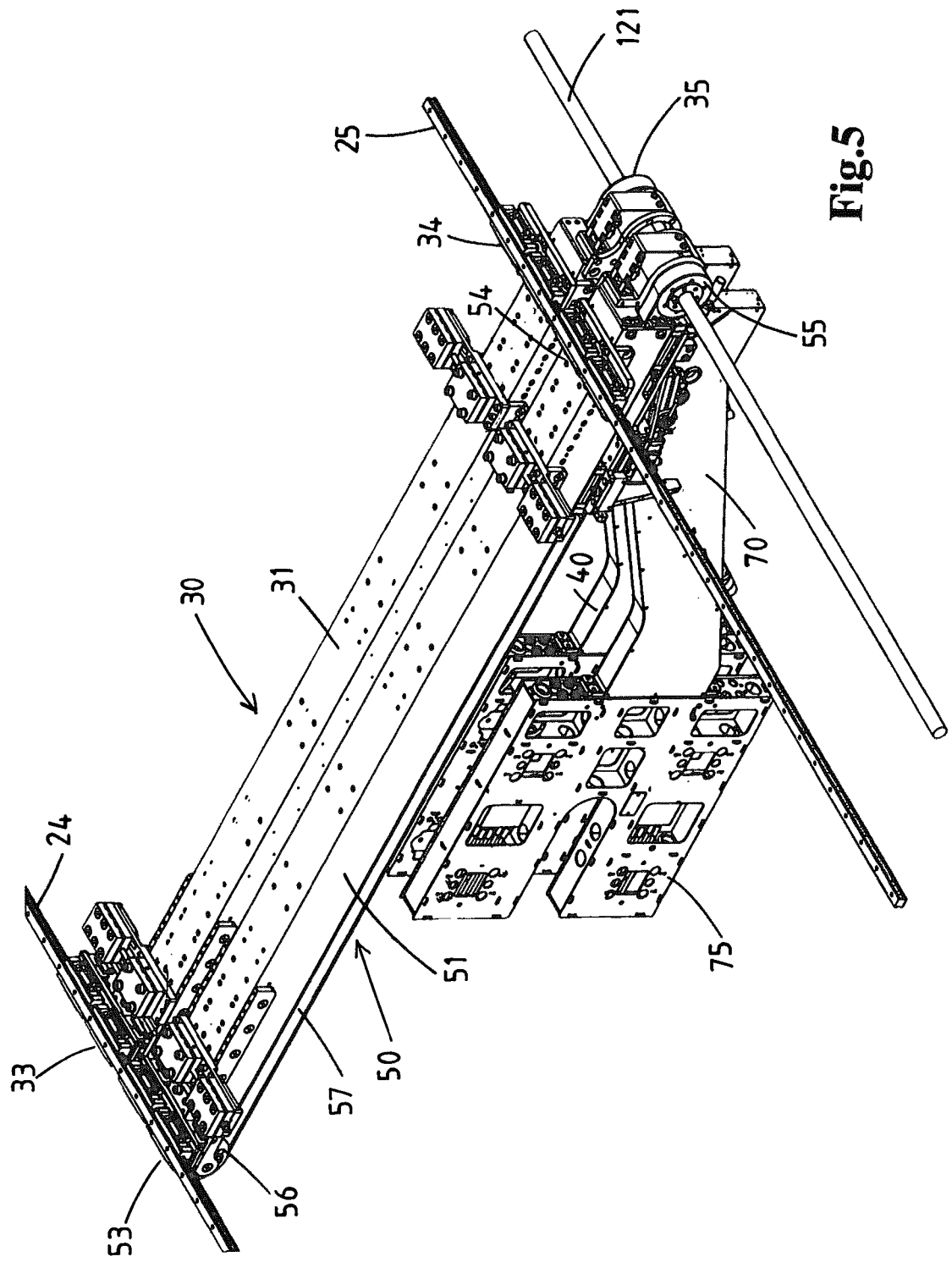

AUTOMATED IN-MOLD LABEL HANDLING AND PRODUCT UNLOADING DEVICE FOR USE WITH A PLASTIC MATERIAL INJECTION-MOLDING MACHINE

FIELD OF THE INVENTION

The present invention relates to the field of injection molding of plastic products using a plastic material injection molding machine provided with a mold having first and second mold members and using the in-mold labelling technique.

BACKGROUND OF THE INVENTION

In-mold labelling is a well-known technique for production of plastic products. Herein a label is placed in each mold of a first mold member of the mold whilst the mold is open. In the molding phase the label becomes integral with molded plastic product. After termination of the molding phase the mold is opened, it is known to cause the product to remain on the second mold member.

In the field many automated devices are known that are configured to handle the label so that the label becomes correctly mounted on the first mold member. In known embodiments, these devices are also configured for unloading the products from the second mold member, generally simultaneously with the handling of the labels.

Examples of prior art automated devices are disclosed in NL1032959, JP2009096012, CN105965498, and CN203994424.

With the general desire to use less plastic materials per product, e.g. for injection molded (food) packaging products, so-called thin wall injection molding has become attractive. This technique allows to mass-produce very thin walled products at very short cycle times. For example, for food packaging containers wall thicknesses that are less than 0.025 inch (0.62 mm) with a flow length to wall thickness greater than 200 are produced according to this technique.

SUMMARY OF THE INVENTION

The present invention aims to provide an improved automated in-mold label handling and product unloading device for a use with a plastic material injection molding machine. For instance, an improvement is sought in regard of the very short cycle times, e.g. when producing products with the thin wall injection molding technique. Also, improvements are sought in view of stability, in particular in view of the high speeds of components in the automated device. In addition, improvements are sought in view of energy use.

The invention achieves one or more of the above objectives by providing an automated in-mold label handling and product unloading device for a use with a plastic material injection molding machine according to the present application.

The inventive automated in-mold label handling and product unloading device is configured for a use with a plastic material injection molding machine comprising a mold with first and second mold members. These first and second mold members are adapted to be displaced relative to one another along a horizontally extending x-axis between an open position and a closed position of the mold. In some embodiments, one of the first and second mold members will be stationary and the other mold member is adapted to be displaced by a mechanism of the injection molding device for closing and opening the mold. This is a very conventional arrangement. The inventive device can also be applied to so-called stack molds, comprising three or more mold members in stacked arrangement, which are displaced relative to one another.

Injection of plastic material into the mold can be done in various arrangements. For example, injection is done via an injection point on the first mold or via an injection point on the second mold. For example, the injection can located at the side of the label or at the side of the product opposite the label. Other arrangements are envisaged as well.

The inventive device comprises two main arms, embodied as:
  a label handling arm provided with a label holder at an outer end thereof, the label holder being configured to releasably hold one or more labels,
  a product unloading arm provided with a product gripper at an outer end thereof, the product gripper being configured to releasably hold one or more molded plastic products.

As customary in the technical field, the mold may be designed to produce multiple products per mold cycle, e.g. four products in a rectangular arrangement in the mold.

As customary in the technical field the label holder may be configured to hold multiple labels simultaneously, arranged corresponding to the product cavities/cores of the mold.

As customary in the technical field the product gripper may be configured to hold multiple products simultaneously, arranged corresponding to the product cavities/cores of the mold.

For example, the label holder is configured to hold four labels and the product gripper is configured to hold four products, with the mold being configured to injection mold four in-mould labelled plastic products in one cycle. Clearly, other numbers, e.g. more than four, are also possible.

The inventive device has a stationary frame. In practical embodiments, the frame is stationed next to the injection molding machine, generally at the location where the mold opens and closes so that the main arms of the inventive device can be introduced laterally, preferably horizontally, between the opened first and second mold members.

The inventive device comprises two linear guide devices:
  a first linear guide device, which first linear guide supports the label handling arm so as to reciprocate along a y-axis direction that is perpendicular to said x-axis between a retracted position and an extended position,
  a second linear guide device, which second linear guide device supports the product unloading arm so as to reciprocate along a y-axis direction that is perpendicular to said x-axis between a retracted position and an extended position.

Herein, in the extended position, the label holder on the label handling arm and the product gripper on the product unloading arm are aligned in x-direction with the respective mold member. So, these components are located between the mold members of the then opened mold.

In the inventive device the first linear guide device is guided relative to the frame so as to be movable parallel to the x-axis. Also, the second linear guide device is guided relative to the frame so as to be movable parallel to the x-axis. As these guide devices each support a respective arm of the inventive device, these arms are also movable in x-axis direction relative to the frame, and thereby relative to the mold members.

The inventive device has a label handling arm x-axis drive mechanism with a respective first drive motor that is mounted on the frame and a first transmission coupled to the first drive motor and to the first linear guide device.

The inventive device has a product unloading arm x-as drive mechanism with a respective second drive motor mounted on the frame and a second transmission coupled to the second drive motor and to the second linear guide device.

The mounting of these first and second drive motors on the frame, allows for a lightweight design of the components of the device that will have to move at very high speeds during operation, e.g. in view of very short cycle time of the injection molding machine. If one or both of these motors would have been mounted on any such moving component, the weight thereof would increase significantly, leading to issues related to vibrations, accuracy, stresses in the device, excessive drive requirements, energy consumption, etc.

The inventive device further has a y-axis drive arrangement comprising at least one y-axis drive motor that is mounted on the frame and a transmission coupling the at least one y-axis drive motor to said label handling arm and said product unloading arm for motion. Again the mounting of this at least one y-axis drive motor on the frame of the device, is advantageous.

The inventive device further comprises a control device controlling the first drive motor, the second drive motor, and the at least one y-axis drive motor, all these motors being mounted on the frame and not moving along with high-speed mobile components during operation of the device.

The control device is configured so that, after termination of an injection molding phase of the molding cycle and with the mold having been brought in the open position, the at least one y-axis motor is operated to advance the label handling arm and the product unloading arm into their respective extended position, which is in the gap between the first and second mold members. This is done so that the label holder is aligned in x-axis direction with the second mold member and is directed towards the second mold member and so that the product gripper is aligned in x-axis direction with the first mold member and is directed towards the first mold member.

In the extended position, the first drive motor is operated to advance the label handling arm provided with the aligned label holder to the second mold member, so as to effect a transfer of the one or more labels held thereby to the second mold member.

In the extended position, the second drive motor is operated to advance the product unloading arm with the aligned product gripper to the first mold member, so as to effect transfer of the one or more injection molded products from the first mold member to the product gripper.

After completion of the label transfer, the first drive motor is operated to withdraw the label handling arm provided with the label holder away from the second mold member.

After completion of the product transfer, the second drive motor is operated to withdraw the product unloading arm provided with the product gripper holding the one or more products away from the first mold member.

Due to the provision of independently controlled first and second drive motors, the label holder and the product gripper can each be cause to move in an optimum manner relative to the respective mold member and independent from one another. This means that label transfer and the product gripping action can be effected simultaneously. Also the gap between the mold members can be kept limited in size.

To complete the motion cycle of the inventive device, the at least one y-axis motor is operated to retract the label handling arm and the product unloading arm from their respective extended position into their retracted position. This retracted position is outside of the trajectory of the first and/or second mold member in closing/opening of the mold.

As customary in the field, the product gripper in its retracted position may then be operated to eject the gripped products, e.g. into a container or onto a conveyor.

As customary in the field, the label holder in its retracted position may be supplied with one or more new labels.

For example, the product gripper is embodied to grip a product based on vacuum suction.

For example, the label holder is embodied to hold a label based on vacuum suction. The label may be charged electrostatic, for electrostatic retention on the mold surface.

It will be appreciated that due to the inventive design, there is no need for any actuable displacement mechanism provided between the label holder and the label handling arm. The motions of this arm itself are sufficiently to correctly position the label holder relative to the mold member in order to effect transfer of the one or more labels. As is highly preferred the inventive device is devoid of any actuable displacement mechanism provided between the label holder and the label handling arm. This allows to save weight, on the mobile components, and increases operational reliability of the device.

It will be appreciated that due to the inventive design, there is no need for any actuable displacement mechanism between the product gripper and the product unloading arm. The motions of this arm itself are sufficiently to correctly position the product gripper relative to the mold member in order to effect gripping of the one or more products from the second mold. As is highly preferred the inventive device is devoid of any actuable displacement mechanism between the product gripper and the product unloading arm. This allows to save weight, on the mobile components, and increases operational reliability of the device.

In embodiments, each of the first and second linear guide devices comprises an elongated chassis that is oriented horizontally and extends in y-direction, wherein each chassis has one or more linear bearing rails extending in y-direction, and wherein each arm is provided with a bearing member, e.g. at an inner end thereof, the bearing member sliding over the respective linear bearing rails in the y-axis direction.

In embodiments, the frame has one or more, e.g. multiple parallel, x-axis rails in a stationary position on the frame that support and guide the first linear guide device and the second linear guide device in direction of the x-axis. For example, the guide devices are supported proximate inner and outer ends thereof on rails. For example, the guide devices are suspended below the x-axis rails.

In embodiments, the first transmission between the first drive motor and the first linear guide device comprises a linear belt drive. For example, the first drive motor drives a rotatable shaft mounted at a stationary location to the frame and extending in y-axis direction, wherein the shaft is fitted with one or more driven pulleys, e.g. two pulleys, wherein the frame supports, spaced from the shaft in x-axis direction, one of more return pulleys, and wherein a belt runs over a driven pulley and a return pulley, e.g. belts, wherein each belt is fastened to the first linear guide device, e.g. to a chassis thereof.

In embodiments, the first drive motor is an electric drive motor and is configured to drive the rotatable shaft in each direction upon command.

In embodiments, the second transmission between the second drive motor and the second linear guide device comprises a linear belt drive. For example, wherein the second drive motor drives a rotatable shaft mounted at a stationary location to the frame and extending in y-axis direction, wherein the shaft is fitted with one or more driven pulleys, e.g. two pulleys, wherein the frame supports, spaced from the shaft in x-axis direction, one of more return pulleys, and wherein a belt runs over a driven pulley and a return pulley, e.g. two belts, wherein each belt is fastened to the second linear guide device, e.g. to a chassis thereof.

In embodiments, the second drive motor is an electric drive motor and is configured to drive the rotatable shaft in each direction upon command.

In embodiments, a chassis of the first linear guide device carries two pulleys, spaced in y-axis direction, e.g. one at the inner end and one at the outer end of the chassis, and wherein a belt is fitted about the pulleys, wherein the belt is connected to the label handling arm, wherein one pulley, e.g. an inner end pulley is the driven pulley that causes the belt to move in a selected direction, which causes the label handling arm to move in and out in y-axis direction, said driven pulley being connected to the at least one y-axis drive motor mounted on the frame.

In embodiments, a chassis of the second linear guide device carries two pulleys, spaced in y-axis direction, e.g. one at the inner end and one at the outer end of the chassis, wherein a belt is fitted about the pulleys, wherein the belt is connected to the product unloading arm, wherein one pulley, e.g. an inner end pulley is the driven pulley that causes the belt to move in a selected direction, which causes the product unloading arm to move in and out in y-axis direction, said driven pulley being connected to the at least one y-axis drive motor mounted on the frame.

In embodiments, one y-axis drive motor is provided that drives a rotatable shaft that is mounted at a stationary location to the frame and extends in x-axis direction, wherein the shaft extends through both the drive pulley of the first linear guide device and through the drive pulley of the second linear guide device.

In an embodiment, the label holder and the product gripper have compatible mechanical interfaces configured to allow each of the label holder and the product gripper to be mechanically connected to a selected one of each of the two arms.

The present invention also relates to a method for handling in-mold labels and unloading products from a plastic material injection molding machine comprising a mold with first and second mold members, said first and second mold members being adapted to be displaced relative to one another along a horizontally extending x-axis between an open position and a closed position of said mold, wherein use is made of an automated in-mold label handling and product unloading device as described herein.

It will be appreciated that the system described herein can also be used when products are injection molded that have no in-mold label. In that situation, the label holder will not be present as no label handling is required.

The present invention also relates to an injection molding system comprising an automated in-mold label handling and product unloading device as described herein and a plastic material injection molding machine comprising a mold with first and second mold members, said first and second mold members being adapted to be displaced relative to one another along a horizontally extending X-axis between an open position and a closed position of said mold.

The present invention also relates to a method for molding plastic products having an in-mold label, wherein use is made of an injection molding system as described herein.

The invention will now be explained with reference to the drawings.

BRIEF DESCRIPTION OF THE DRAWINGS

In the drawings:

FIG. 5 shows the part of FIG. 4 from above in perspective view.

DETAILED DESCRIPTION OF EMBODIMENTS

Figure 1:
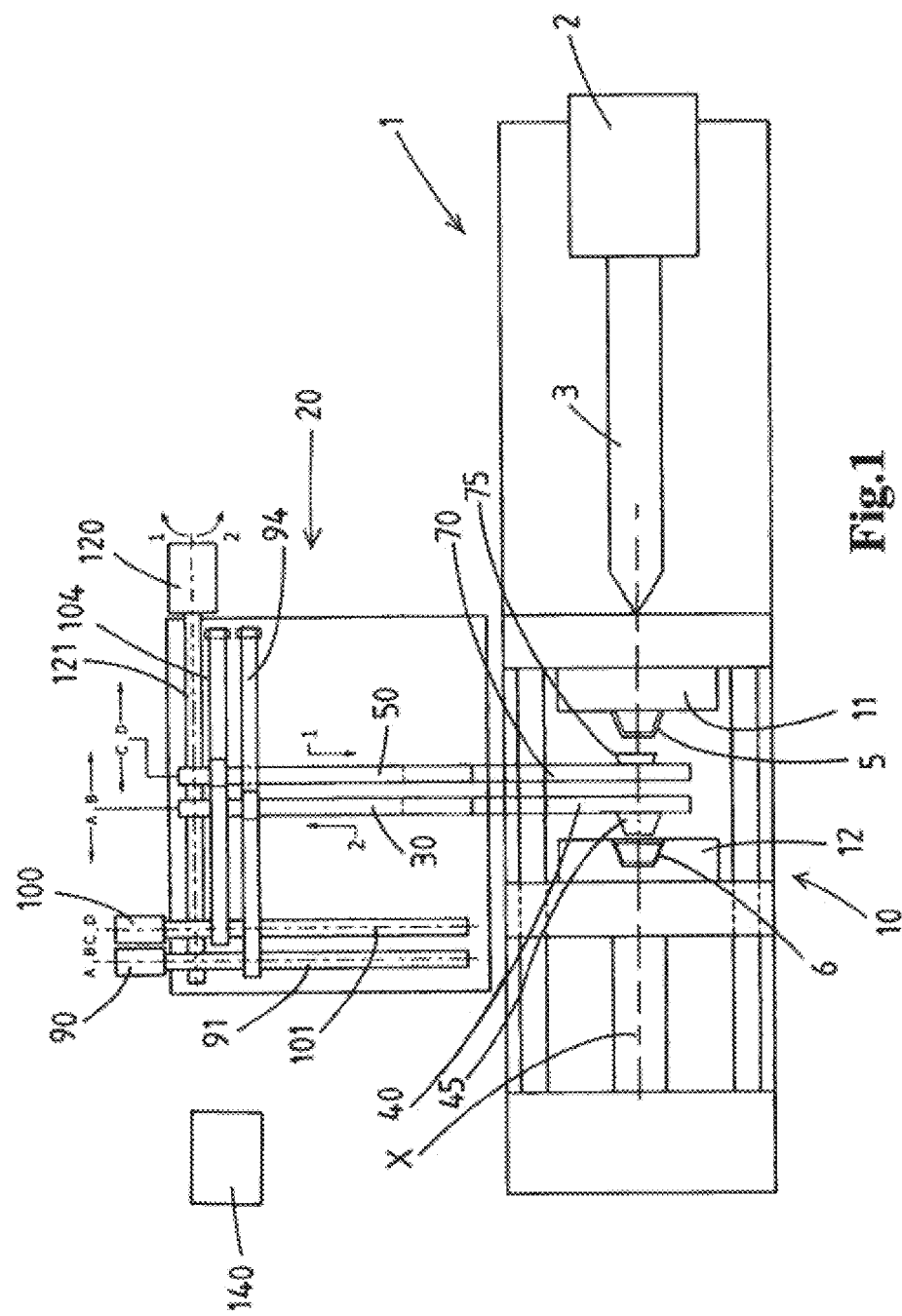
FIG. 1 illustrates in plan view and schematically an injection molding system comprising an injection molding machine and an automated in-mold label handling and product unloading device according to the invention.

In FIG. 1 reference numeral 1 denotes a plastic material injection molding machine, e.g. embodied for the mentioned thin wall injection molding at very short cycle times. For example, cycle times of at most 3 seconds are envisaged within the scope of the application of the present invention, but longer cycle times can also occur depending on the product. For example, the machine 1 is used for injection molding thin wall packaging products, e.g. lids and containers.

Generally the machine 1 comprises an extruder 2 having a extrusion barrel 3.

The machine 1 further comprises a mold 10. In practical embodiments, the mold 10 will be an exchangeable mold in order to manufacture different products on the machine 1.

The mold 10 comprises a first mold member 11 and a second mold member 12.

These first and second mold members 11, 12 are adapted to be displaced relative to one another along a horizontally extending x-axis X between an open position (shown in FIG. 1) and a closed position of the mold 10.

FIG. 1 schematically depicts a molded plastic product 5.
FIG. 1 schematically depicts an in-mold label 6.

FIG. 1 also schematically depicts an automated in-mold label handling and product unloading device 20 for a use the plastic material injection molding machine 1. As will be appreciated the FIGS. 2-5 show in detail an exemplary embodiment of such a device 20. Therefore, components in FIG. 1 and in FIGS. 2-5 have been given the same reference numerals where appropriate.

The device 20 has a stationary frame 21, e.g. a frame 21 that is to be mounted next to the machine 1 at the location where the mold 10 opens and closes. For example, the frame 21 is to be secured to the floor next to the machine 1.

For example, as shown in FIGS. 2-5, the frame 21 has vertical posts 22 and an overhead frame structure 23 supported by the posts 22.

The device 20 comprises a label handling arm 40 that is provided with a label holder 45 at an outer end thereof. The label holder 45 is configured to releasably hold one or more labels 6 that are made for the in-mold labelling technique in order to be integrated with the molded plastic product 5 during production in the mold 10.

The device 20 comprises a product unloading arm 70 that is provided with a product gripper 75 at an outer end thereof. The product gripper 75 is configured to releasably hold one or more molded plastic products 5.

FIG. 1 schematically shows the label holder 45 and product gripper 75.

Figure 2:
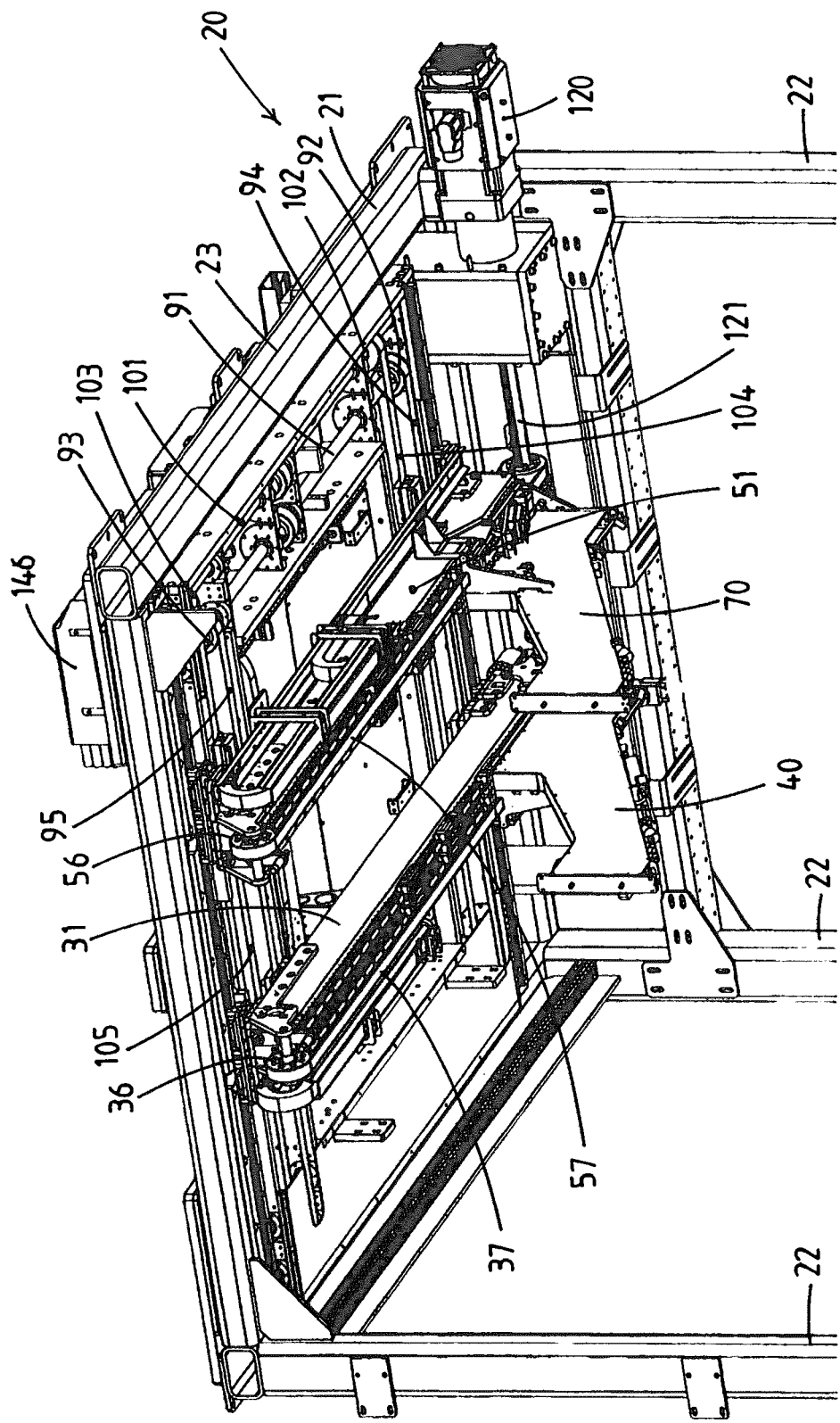
FIG. 2 shows in a perspective view from below a part of an example of an automated in-mold label handling and product unloading device according to the invention.
Figure 3:
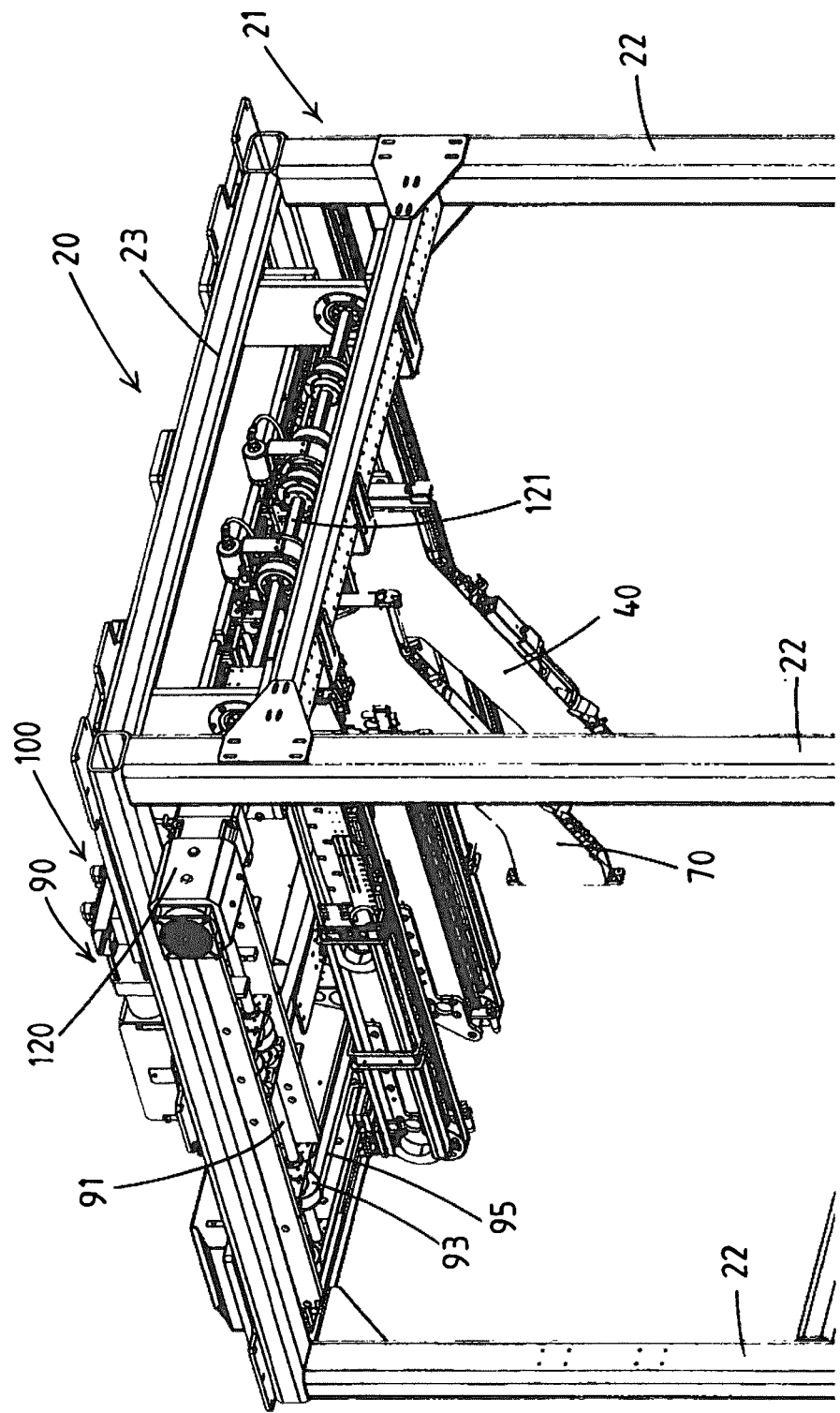
FIG. 3 shows the device of FIG. 2 from a different angle.
Figure 4:
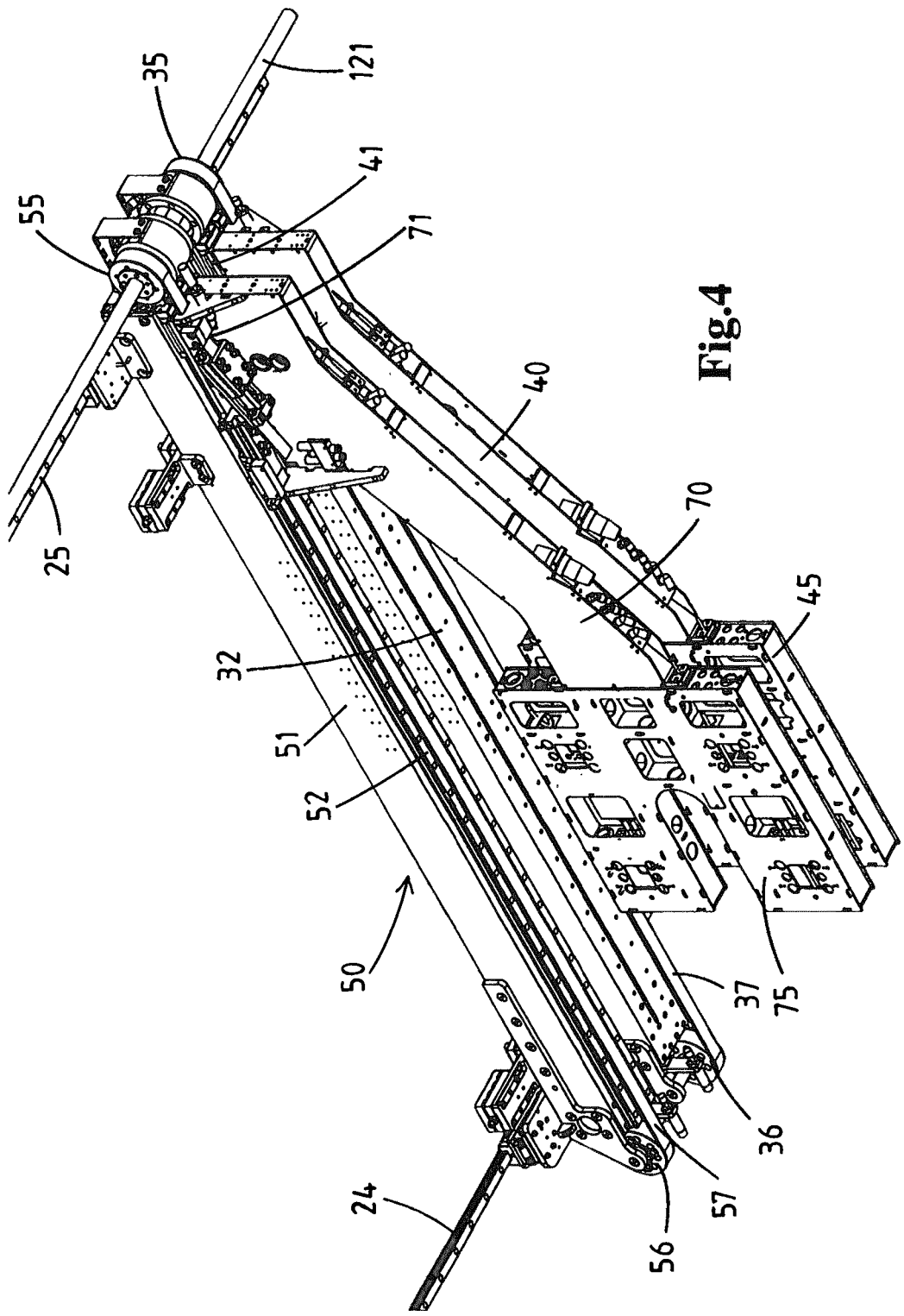
FIG. 4 shows a part of the device of FIG. 2 from below in perspective view.

In FIGS. 2, 3 the label holder 45 and product gripper 75 are not shown. In FIGS. 4, 5 only the base plates of the label holder 45 and the product gripper 75 are shown. As customary in the art one or more label holder members can be affixed on the base plate of the label holder, e.g. with bolts. As customary in the art, one or more product gripper members can be affixed on the base plate of the product gripper, e.g. with bolts.

The device 20 comprises a first linear guide device 30. This first linear guide device 30 supports the label handling arm 40 so as to reciprocate relative to the first linear guide device 30 along a y-axis direction that is perpendicular to said x-axis X between a retracted position and an extended position.

The device 20 a second linear guide device 50. This second linear guide device 50 supports the product unloading arm 70 so as to reciprocate relative to the second linear guide device 70 along a y-axis direction that is perpendicular to said x-axis X between a retracted position and an extended position.

FIG. 1 schematically shows the extended position of the arms 40, 70. The other figures show the retracted position.

For example, as shown, each of the first and second linear guide devices 30, 50 comprises an elongated chassis 31, 51 that is oriented horizontally and extends in a y-direction. Each chassis has an inner end and an outer end. Herein the outer end is the end directed towards the machine 1, and the inner end of the chassis is remote from the machine 1.

For example, as shown, each chassis 31, 51 has one or more linear bearing rails 32, 52 extending in y-direction, e.g. at a bottom side of the chassis as shown here. Each arm 40, 70 is provided with a bearing member 41, 71 at an inner end thereof, e.g. at a top side of the arm 40, 70 as shown here, the bearing member 41, 71 sliding over the respective linear bearing rails 32, 52 in the y-axis direction.

The first linear guide device 30 is guided relative to the frame 21 so as to be movable parallel to the x-axis.

The second linear guide device 50 is guided relative to the frame 21 so as to be movable parallel to the x-axis.

As shown in FIGS. 2-5 the frame 21 has parallel x-axis rails 24, 25 in stationary position that support and guide both the first linear guide device 30 and the second linear guide device 50 in direction of the x-axis. For example, the guide devices 30 and 50 are supported proximate their inner and outer ends on the rails 24, 25. As shown each guide member chassis 31, 51 may be provided with x-axis bearing members 33, 34, 53, 54 that slide over the x-axis rails 24, 25 stationary mounted on the frame 21.

For example, as shown, the guide devices 30, 50 are suspended below the x-axis rails 24, 25.

The device 20 has a label handling arm x-axis drive mechanism with a respective first drive motor 90 that is mounted on the frame 21. This motor 90 is coupled via a first transmission to the first linear guide device 30.

The device 20 has a product unloading arm x-axis drive mechanism with a respective second drive motor 100 mounted on the frame 21. This motor 100 is coupled via a second transmission to the second linear guide device 50.

Generally, the device 20 has a y-axis drive arrangement comprising at least one y-axis drive motor 120 mounted on the frame 21 and a transmission coupling the at least one y-axis drive motor 120 to the label handling arm 40 and the product unloading arm 70 for motion of the label handling arm 40 and of the product unloading arm 70 between their respective extended position and retracted position.

As shown the first transmission between the first drive motor 90 and the first linear guide device 30 may comprises a linear belt drive.

The first drive motor 90 drives a rotatable shaft 91 mounted at a stationary location to the frame 21 and extending in y-axis direction. The shaft 91 is fitted with one or more driven pulleys, here two pulleys 92, 93. The frame 21 supports, spaced from the shaft 91 in x-axis direction, one of more return pulleys. A belt runs over a driven pulley and a return pulley, here belts 94, 95. Each belt 94, 95 is fastened to the first linear guide device 30, here to chassis 31 thereof, here at spaced apart locations.

The first drive motor 90 is an electric drive motor, and is configured to drive the output shaft thereof in each direction upon command. Thereby, the guide device 30 can be displaced, at high speed and accuracy, in x-axis direction.

As shown the second transmission between the second drive motor 100 and the second linear guide device 50 may comprises a linear belt drive.

The second drive motor 100 drives a rotatable shaft 101 mounted at a stationary location to the frame 21 and extending in y-axis direction, here parallel and adjacent to shaft 91. The shaft 101 is fitted with one or more driven pulleys, here two pulleys 102, 103. The frame 21 supports, spaced from the shaft 101 in x-axis direction, one of more return pulleys. A belt runs over a driven pulley and a return pulley, here belts 104, 105. Each belt 104, 105 is fastened to the second linear guide device 50, here to chassis 51 thereof, here at spaced apart locations.

The second drive motor 100 is an electric drive motor, and is configured to drive the output shaft thereof in each direction upon command. Thereby, the guide device 50 can be displaced, at high speed and accuracy, in x-axis direction.

The first and second drive motors 90, 100 as well as the first and second transmission to the guide devices 30, 50 respectively from independently controllable drive trains, so that the x-axis direction motion of the arms 40, 70 can be independently controlled. More in particular the motion of the label holder relative to the mold member can be done independent from the motion of the product gripper relative to the mold member. And, as explained, the drive motors 90, 100 driving these motions are mounted on the frame 21.

As shown in FIGS. 2-5 the chassis of the guide device 30 carries two pulleys 35, 36, spaced in y-axis direction, e.g. one at the inner end and one at the outer end of the chassis 31. A belt 37 is fitted about the pulleys 35, 36. The belt 37 is connected to the arm 40, at the inner end thereof. The inner end pulley 35 is the driven pulley that causes the belt 37 to move in a selected direction, which causes the arm 40 to move in and out in y-axis direction.

As shown in FIGS. 2-5 the chassis of the guide device 50 carries two pulleys 55, 56, spaced in y-axis direction, e.g. one at the inner end and one at the outer end of the chassis 51. A belt 57 is fitted about the pulleys 55, 56. The belt 57 is connected to the arm 70, at the inner end thereof. The inner end pulley 55 is the driven pulley that causes the belt 57 to move in a selected direction, which causes the arm 70 to move in and out in y-axis direction.

The routine can, in practical examples, be performed in a very short time, e.g. in pace with an injection molding cycle of in total at most 3 seconds.

Accelerations of the arms in y-direction may be above 10 G in both advancing and retracting motion to achieve the very short duration of the routine. This is possible as the arms carry only essential components for retention of the label or for gripping of the product, which components do not perform any motions in x direction and y-direction as those are governed by the motors arranged on the stationary frame. Also the arms 40, 70 themselves are preferably lightweight, e.g. of carbon fiber, etc.

As shown in the FIGS. 2-5 the arms 40, 70 preferably are embodied as plate-like bodies having a length in y-axis, a height in z-axis, and a width in x-axis. The height is several times greater than the width, to achieve high stability of the arms.

As shown the arms 40, 70 may have identical shape and connections to the guide devices and to the label holder/product gripper at the outer end. This, for example, allows to reduce inventory costs for replacement arms.

In an embodiment, the label holder 45 and the product gripper 75 have compatible mechanical interfaces configured to allow each of the label holder and the product gripper to be mechanically connected to a selected one of each of the two arms 40, 70.

In an embodiment, the label holder 45 and the product gripper 75 can be swapped between the arms 40, 70 of the device 20, e.g. in view of the molding of a different product using a different mold. So, considering FIG. 1, the product holder 75 would then be mounted on arm 40 and the label holder on arm 70.

As shown in the FIGS. 2-5, in an embodiment, there is one y-axis drive motor 120 that causes the label handling arm 40 and of the product unloading arm 70 to move in unison between their respective extended position and retracted position.

The drive motor 120 here drives a rotatable shaft 121 that is mounted at a stationary location to the frame 21 and extends in x-axis direction. The shaft 121 extends through both the inner end pulley 35 and the inner end pulley 55, or could be rotatably connected to such inner end pulley in another manner.

The y-axis drive motor 120 is an electric drive motor, and is configured to drive the output shaft and the shaft 121 connected thereto in each direction upon command. Thereby, the pulleys 35 and 55 are driven, and thus the belts 37, 57 which causes the arms 40, 70 to move in y-axis direction relative to the associated guide device 30, 50 in synchronous manner.

The provision of just one y-axis drive motor 120 is considered advantageous for structural reasons, e.g. allowing the guide devices 30, 50 to be similar in design as is preferred, e.g. as the inner pulleys 35 and 55 can now be at the very same spatial location.

It is noted that in an alternative embodiment, two y-axis drive motors can be provided, each cooperating via a respective shaft with one of the inner pulleys 35, 55 so as to have an independent drive train for each arm 40, 70 in y-axis direction.

As shown, the x-axis motion of the label holder 45 relative to the mold member 12, e.g. of the base plate and the one or more label holder members affixed thereon, is solely governed by the x-as drive of the guide device 30. The device 20 is devoid of any actuable displacement mechanism provided between the label holder 45 and the label handling arm 40.

As shown, the x-axis motion of the product gripper 75 relative to the mold member 11, e.g. of the base plate and one or more gripper members affixed therein, is solely governed by the x-axis drive of the guide member 50. The device 20 is devoid of any actuable displacement mechanism between the product gripper 75 and the product unloading arm 70.

A control device 140, e.g. a computerized and programmed controller, is provided to control operation of the device 20, including controlling the first drive motor 90, the second drive motor 100, and the y-axis drive motor 120. Preferably, the device 140 is also linked to a controller of the extruder 2.

The control device 140 is configured, e.g. programmed, so that, after termination of the injection molding phase and with mold 10 having been brought in the open position the device 20 acts to place one or more new labels 6 on mold member 12 and to remove one or more injection molded plastic products 5 from the other mold member 11. This is done by a routine, performed at high speed, that comprises operating the y-axis drive motor 120 to advance the label handling arm 40 and the product unloading arm 70 from their retracted position into their respective extended position (see FIG. 1), in the gap between the first and second mold members 11, 12, so that the label holder 45 is aligned in x-axis direction with the second member 12 and is directed to said second mold member 12 and so that the product gripper 75 is aligned in x-axis direction with the first mold member 11 and is directed to said first mold member 11. As shown herein, in this embodiment, the arms 40, 70 are moved in unison.

Once the arms 40, 70 have been extended, the routine comprises operating the first x-axis drive motor 90 to advance the label handling arm 40 provided with the aligned label holder 45 to the second mold member 12, so as to effect transfer of the one or more labels 6 held thereby to the second mold member 12. For example, the one or more labels 6 are held on the holder 45 by vacuum suction. At the moment of transfer this vacuum is released. The label 6 can, in embodiments, be held in the mold member by means of an electrostatic bond between the electrostatically charged label 6 and the metal mold member. For example, a static charge is placed on the label 6 using static charge applicator device 146. An alternative is holding the label 6 in the mold member using vacuum suction.

Generally simultaneous with the above described x-motion of the label handling arm 40 and label holder 45, the second drive motor 100 is operated to advance the product unloading arm 70 with the aligned product gripper 75 to the first mold member 11, so as bring the gripper 75 into engagement with the one or more products 5 that are present on the mold member 11. The gripper 75 is then operated to perform its gripping action, which could for instance mean that vacuum suction is applied to grip the product and/or a mechanical grip is achieved. Hereby transfer of the one or more injection molded products from the first mold member 11 to the product gripper 75 is achieved.

After completion of the label transfer, the first drive motor 90 is operated to withdraw the label handling arm 70 provided with the aligned label holder 45 away from the second mold member 12.

After completion of the product transfer to the gripper 75, the second drive motor 100 is operated to withdraw the product unloading arm 70 provided with the product gripper 75 holding the one or more products 5 away from the first mold member 11.

It will be appreciated that the x-motions of the label holder 45 and the gripper 75 can be performed independently due to the presence of individual drive trains. This allows to optimize each motion and have a high overall speed of these operations.

In a final step of the routine, the y-axis motor 120 is operated to retract the label handling arm 40 and the product unloading arm 70 from their respective extended position into their retracted position, outside the trajectory of the first and/or second mold member 11, 12 in closing of the mold.

As known in the art, now one or more new labels 6 can be loaded onto the label holder 45.

As known in the art, now the products 5 can be released from the gripper 75. For example, the products are dropped on a conveyor or in a container, or transferred to some other handler device.

As can be understood from the FIGS. 2-5 the arms 40, 70 are here embodied to allow exchange of the position of the label holder 45 and the product gripper 75, so that now the label holder faces the extruder and the product gripper faces away from the extruder.

The invention claimed is:

1. A method for handling in-mold labels and unloading products from a plastic material injection molding machine comprising a mold with first and second mold members, said first and second mold members being adapted to be displaced relative to one another along a horizontally extending x-axis between an open position and a closed position of said mold, wherein use is made of an automated in-mold label handling and product unloading device, wherein the automated in-mold label handling and product unloading device comprises: a label handling arm provided with a label holder at an outer end thereof, the label holder being configured to releasably hold one or more labels, a product unloading arm provided with a product gripper at an outer end thereof, the product gripper being configured to releasably hold one or more molded plastic products, a stationary frame, a first linear guide device, wherein the first linear guide device supports the label handling arm so as to reciprocate relative to the first linear guide device along a y-axis direction that is perpendicular to said x-axis between a retracted position and an extended position, a second linear guide device, wherein the second linear guide device supports the product unloading arm so as to reciprocate relative to the second linear guide device along a y-axis direction that is perpendicular to said x-axis between a retracted position and an extended position, wherein the first linear guide device is guided relative to the frame so as to be movable parallel to said x-axis, wherein the second linear guide device is guided relative to the frame so as to be movable parallel to said x-axis, a label handling arm x-axis drive mechanism having a respective first drive motor mounted on the frame and a first transmission coupled to said first drive motor and to the first linear guide device, a product unloading arm x-axis drive mechanism having a respective second drive motor mounted on the frame and a second transmission coupled to said second drive motor and to the second linear guide device, a y-axis drive arrangement comprising at least one y-axis drive motor mounted on the frame and a transmission coupling said at least one y-axis drive motor to said label handling arm and said product unloading arm for motion of the label handling arm and of the product unloading arm between their respective extended position and retracted position, a control device controlling said first drive motor, said second drive motor, and said at least one y-axis drive motor, wherein the control device is configured so that, after termination of an injection molding phase and with the mold having been brought in said open position so that a gap is present between the first and second mold members: i) the at least one y-axis drive motor is operated to advance the label handling arm and the product unloading arm from their retracted position into their respective extended position, in the gap between the first and second mold members, so that the label holder is aligned in x-axis direction with the second mold member and is directed to said second mold member and so that the product gripper is aligned in x-axis direction with the first mold member and is directed to said first mold member, ii) the first drive motor is operated to advance the label handling arm provided with the aligned label holder to the second mold member, so as to effect transfer of the one or more labels held thereby to the second mold member, iii) the second drive motor is operated to advance the product unloading arm with the aligned product gripper to the first mold member, so as to effect transfer of the one or more injection molded products from the first mold member to the product gripper, iv) after completion of the label transfer, the first drive motor is operated to withdraw the label handling arm provided with the label holder away from the second mold member, v) after completion of the product transfer, the second drive motor is operated to withdraw the product unloading arm provided with the product gripper holding the one or more products away from the first mold member, vi) the least one y-axis motor is operated to retract the label handling arm and the product unloading arm from their respective extended position into their retracted position, outside the trajectory of the first and/or second mold member in closing of the mold.

2. The method according to claim 1, wherein the automated in-mold label handling and product unloading device is devoid of any actuable displacement mechanism provided between the label holder and the label handling arm.

3. The method according to claim 1, wherein the automated in-mold label handling and product unloading device is devoid of any actuable displacement mechanism between the product gripper and the product unloading arm.

4. The method according to claim 1, wherein each of the first and second linear guide devices comprises an elongated chassis that is oriented horizontally and extends in y-direction, wherein each chassis has one or more linear bearing rails extending in y-direction, and wherein each arm is provided with a bearing member at an inner end thereof, the bearing member sliding over the respective linear bearing rails in the y-axis direction.

5. The method according to claim 1, wherein the frame has parallel x-axis rails in a stationary position on the frame that support and guide both the first linear guide device and the second linear guide device in direction of the x-axis.

6. The method according to claim 1, wherein the first transmission between the first drive motor and the first linear guide device comprises a linear belt drive, wherein the first drive motor drives a rotatable first shaft mounted at a stationary location to the frame and extending in y-axis direction, wherein the first rotatable shaft is fitted with one or more driven pulleys, wherein the frame supports, spaced from the first shaft in x-axis direction, one of more return pulleys, and wherein a first belt runs over a driven pulley and a return pulley, wherein each first belt is fastened to the first linear guide device.

7. The method according to claim 6, wherein the first drive motor is an electric drive motor and is configured to drive the rotatable first shaft in each direction upon command.

8. The method according to claim 1, wherein the second transmission between the second drive motor and the second linear guide device comprises a linear belt drive, wherein the second drive motor drives a rotatable second shaft mounted at a stationary location to the frame and extending in y-axis direction, wherein the rotatable second shaft is fitted with one or more driven pulleys, wherein the frame supports, spaced from the second shaft in x-axis direction, one of more return pulleys, and wherein a second belt runs over a driven pulley and a return pulley, e wherein each second belt is fastened to the second linear guide device.

9. The method according to claim 8, wherein the second drive motor is an electric drive motor and is configured to drive the rotatable second shaft in each direction upon command.

10. The method according to claim 1, wherein a chassis of the first linear guide device carries two pulleys, spaced in y-axis direction, and wherein a belt is fitted about the two pulleys, wherein the belt is connected to the label handling arm, wherein one pulley is a driven pulley that causes the belt to move in a selected direction, which causes the label handling arm to move in and out in y-axis direction, said driven pulley being connected to the at least one y-axis drive motor mounted on the frame.

11. The method according to claim 1, wherein a chassis of the second linear guide device carries two pulleys, spaced in y-axis direction, and wherein a belt is fitted about the two pulleys, wherein the belt is connected to the product unloading arm, wherein one pulley is a driven pulley that causes the belt to move in a selected direction, which causes the product unloading arm to move in and out in y-axis direction, said driven pulley being connected to the at least one y-axis drive motor mounted on the frame.

12. The method according to claim 10, wherein one y-axis drive motor is provided that drives a rotatable third shaft that is mounted at a stationary location to the frame and extends in x-axis direction, wherein the third shaft extends through both the driven pulley of the first linear guide device and through the driven pulley of the second linear guide device.

13. An injection molding system comprising an automated in-mold label handling and product unloading device and a plastic material injection molding machine comprising a mold with first and second mold members, said first and second mold members being adapted to be displaced relative to one another along a horizontally extending X-axis between an open position and a closed position of said mold, wherein automated in-mold label handling and product unloading device comprises:
  a label handling arm provided with a label holder at an outer end thereof, the label holder being configured to releasably hold one or more labels,
  a product unloading arm provided with a product gripper at an outer end thereof, the product gripper being configured to releasably hold one or more molded plastic products,
  a stationary frame,
  a first linear guide device, wherein the first linear guide device supports the label handling arm so as to reciprocate relative to the first linear guide device along a y-axis direction that is perpendicular to said x-axis between a retracted position and an extended position,
  a second linear guide device, wherein the second linear guide device supports the product unloading arm so as to reciprocate relative to the second linear guide device along a y-axis direction that is perpendicular to said x-axis between a retracted position and an extended position,
  wherein the first linear guide device is guided relative to the frame so as to be movable parallel to said x-axis,
  wherein the second linear guide device is guided relative to the frame so as to be movable parallel to said x-axis,
  a label handling arm x-axis drive mechanism having a respective first drive motor mounted on the frame and a first transmission coupled to said first drive motor and to the first linear guide device,
  a product unloading arm x-axis drive mechanism having a respective second drive motor mounted on the frame and a second transmission coupled to said second drive motor and to the second linear guide device,
  a y-axis drive arrangement comprising at least one y-axis drive motor mounted on the frame and a transmission coupling said at least one y-axis drive motor to said label handling arm and said product unloading arm for motion of the label handling arm and of the product unloading arm between their respective extended position and retracted position,
  a control device controlling said first drive motor, said second drive motor, and said at least one y-axis drive motor,
  wherein the control device is configured so that, after termination of an injection molding phase and with the mold having been brought in said open position so that a gap is present between the first and second mold members:
  i) the at least one y-axis drive motor is operated to advance the label handling arm and the product unloading arm from their retracted position into their respective extended position, in the gap between the first and second mold members, so that the label holder is aligned in x-axis direction with the second mold member and is directed to said second mold member and so that the product gripper is aligned in x-axis direction with the first mold member and is directed to said first mold member,
  ii) the first drive motor is operated to advance the label handling arm provided with the aligned label holder to the second mold member, so as to effect transfer of the one or more labels held thereby to the second mold member,
  iii) the second drive motor is operated to advance the product unloading arm with the aligned product gripper to the first mold member, so as to effect transfer of the one or more injection molded products from the first mold member to the product gripper,
  iv) after completion of the label transfer, the first drive motor is operated to withdraw the label handling arm provided with the label holder away from the second mold member,
  v) after completion of the product transfer, the second drive motor is operated to withdraw the product unloading arm provided with the product gripper holding the one or more products away from the first mold member,
  vi) the least one y-axis motor is operated to retract the label handling arm and the product unloading arm from their respective extended position into their retracted position, outside the trajectory of the first and/or second mold member in closing of the mold.

14. A method for molding plastic products having an in-mold label, wherein use is made of an injection molding system according to claim 13.

* * * * *